United States Patent
Tominaga et al.

(10) Patent No.: US 11,249,574 B2
(45) Date of Patent: Feb. 15, 2022

(54) DISPLAY DEVICE

(71) Applicant: SHARP KABUSHIKI KAISHA, Sakai (JP)

(72) Inventors: Masakatsu Tominaga, Sakai (JP); Isao Ogasawara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/217,080

(22) Filed: Mar. 30, 2021

(65) Prior Publication Data

US 2021/0311578 A1 Oct. 7, 2021

(30) Foreign Application Priority Data

Apr. 3, 2020 (JP) .............................. JP2020-067252

(51) Int. Cl.
*G06F 3/041* (2006.01)
*G02F 1/1362* (2006.01)
*G02F 1/1368* (2006.01)

(52) U.S. Cl.
CPC .......... *G06F 3/0412* (2013.01); *G02F 1/1368* (2013.01); *G02F 1/136286* (2013.01)

(58) Field of Classification Search
CPC ......................... G02F 1/136286; G02F 1/1368
See application file for complete search history.

(56) References Cited

U.S. PATENT DOCUMENTS

| | | | | |
|---|---|---|---|---|
| 8,179,381 B2* | 5/2012 | Frey | ...................... | G06F 3/0446 345/174 |
| 8,717,321 B2* | 5/2014 | Kim | ...................... | G06F 3/0443 345/173 |
| 9,766,756 B2* | 9/2017 | Yoshida | ................ | G06F 3/0444 |
| 10,234,970 B2* | 3/2019 | Cao | ........................ | G06F 3/0445 |
| 10,564,460 B2* | 2/2020 | Tada | ................... | G06F 3/04166 |
| 10,698,517 B2* | 6/2020 | Aoki | ...................... | G06F 3/0446 |
| 10,969,614 B2* | 4/2021 | Kurasawa | ........... | G02F 1/13338 |
| 10,969,886 B2* | 4/2021 | Wen | ....................... | G06F 3/0412 |
| 2010/0220071 A1 | 9/2010 | Nishihara et al. | | |
| 2014/0253827 A1* | 9/2014 | Gao | ....................... | G06F 3/0445 349/12 |
| 2018/0284922 A1 | 10/2018 | Teranishi et al. | | |

FOREIGN PATENT DOCUMENTS

JP 2010-218542 A 9/2010
JP 2018-169680 A 11/2018

* cited by examiner

*Primary Examiner* — Ricardo Osorio
(74) *Attorney, Agent, or Firm* — ScienBiziP, P.C.

(57) ABSTRACT

A display device includes pixel electrodes, a first driver disposed outside a display area in which the pixel electrodes are arrayed, a touch sensor electrode which is disposed within the display area and to which a drive signal is applied from the first driver, a first wire which is disposed outside the display area and to which the drive signal is applied from the first driver, and a second wire disposed outside the display area. A predetermined electric potential is applied to the second wire, and the first wire is disposed between the second wire and the display area.

9 Claims, 6 Drawing Sheets

DISPLAY DEVICE

BACKGROUND

1. Field

The present disclosure relates to a display device having a touch detection function of detecting a touch position.

2. Description of the Related Art

Japanese Unexamined Patent Application Publication No. 2018-169680 discloses a display device having a touch detection function. In the display device, electrodes for a touch sensor are formed on a substrate on which pixel electrodes are formed. The display device includes electrodes for the touch sensor additionally in an area outside a display area in which the pixel electrodes are disposed.

In the display device described in Japanese Unexamined Patent Application Publication No. 2018-169680, when electrostatic discharge (ESD) is generated, there is a possibility of breakdown of an electrode in a peripheral area or an electrode in the display area. Particularly, there is a possibility that ESD causes breakdown of an electrode for the touch sensor, which is formed in the peripheral area, or breakdown of an electrode for the touch sensor, which is in the display area and capacitively coupled to the electrode in the peripheral area.

The disclosure provides a display device in which accuracy in detecting a touch position is enhanced and in which breakdown caused by ESD is suppressed.

SUMMARY

A display device according to an embodiment of the disclosure includes: a plurality of pixel electrodes; a first driver disposed outside a display area in which the plurality of pixel electrodes are arrayed; a touch sensor electrode which is disposed within the display area and to which a drive signal is applied from the first driver; a first wire which is disposed outside the display area and to which the drive signal is applied from the first driver; and a second wire disposed outside the display area. A predetermined electric potential is applied to the second wire. The first wire is disposed between the second wire and the display area. The display area includes a first side closest to the first driver, a second side facing the first side, and a third side and a fourth side each of which extends between the first side and the second side. Each of the first wire and the second wire is disposed along the second side, the third side, and the fourth side. The first wire is divided into a first part and a second part. The first part and the second part are separated in a direction parallel to any of the second side, the third side, and the fourth side to form a gap between the first part and the second part. The second wire is disposed on a straight line passing through the gap and the display area.

DESCRIPTION OF THE EMBODIMENTS

Figure 1:
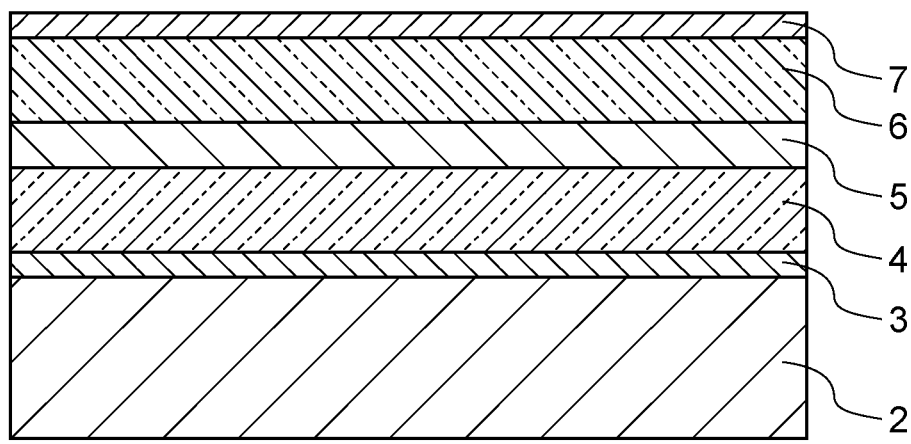
FIG. 1 is a sectional view illustrating a configuration of a display device according to a first embodiment.

Embodiments of the disclosure will be hereinafter described in detail with reference to the drawings. In the drawings, identical or equivalent parts will be given the same reference numerals, and description thereof will be omitted. To make explanation easy to understand, in the drawings referred to below, configurations are simplified or schematically illustrated, or a portion of constituents is omitted. Moreover, dimensional ratios of the constituents illustrated in drawings do not necessarily indicate actual dimensional ratios.

First Embodiment

FIG. 1 is a sectional view illustrating a configuration of a display device 1 according to a first embodiment. As illustrated in FIG. 1, the display device 1 includes a backlight 2, a first polarizer 3, a first substrate 4, a liquid crystal layer 5, a second substrate 6, and a second polarizer 7 which are stacked in this order. Note that a direction from the backlight 2 to the second polarizer 7 is hereinafter referred to as "upper direction".

The backlight 2 includes a light source such as a light emitting diode (LED) and emits planar light in the upper direction. Each of the first polarizer 3 and the second polarizer 7 selectively transmits light which oscillates in a specific direction. The first substrate 4 has a transparent substrate formed of glass or the like, and a pixel electrode and an electrode for a touch sensor (hereinafter, referred to as "touch sensor electrode") are formed on the substrate. The liquid crystal layer 5 contains liquid crystal molecules that change the oscillating direction of light in accordance with an orientation. The second substrate 6 has a transparent substrate formed of glass or the like, and a color filter that transmits light of a specific wavelength (color) is formed on the substrate. For example, on the substrate of the second substrate 6, color filters of three colors of red (R), green (G), and blue (B) that are arrayed in a predetermined pattern are formed.

In the display device 1, the oscillating direction of the light emitted from the backlight 2 is aligned when the light is transmitted through the first polarizer 3, and thereafter the light is transmitted through the first substrate 4 and the liquid crystal layer 5. When a voltage is applied from each of the pixel electrodes included in the first substrate 4, the liquid crystal molecules contained in the liquid crystal layer 5 change their orientation for each predetermined area (each pixel) in the liquid crystal layer 5. Thus, the oscillating direction of the light transmitted through the liquid crystal layer 5 may differ in accordance with the area through which the light is transmitted. The light transmitted through the liquid crystal layer 5 is transmitted through the color filter included in the second substrate 6 and is then transmitted through or blocked by the second polarizer 7 in accordance with the oscillating direction. Thereby, an image is displayed on the display device 1.

The display device 1 has an image display function as described above and also has a touch detection function of detecting a touch position which is a position of a portion touched or approached by a finger or the like. Particularly, the display device 1 is an in-cell display device in which the pixel electrodes and the touch sensor electrodes are both formed on the first substrate 4.

Figure 2:
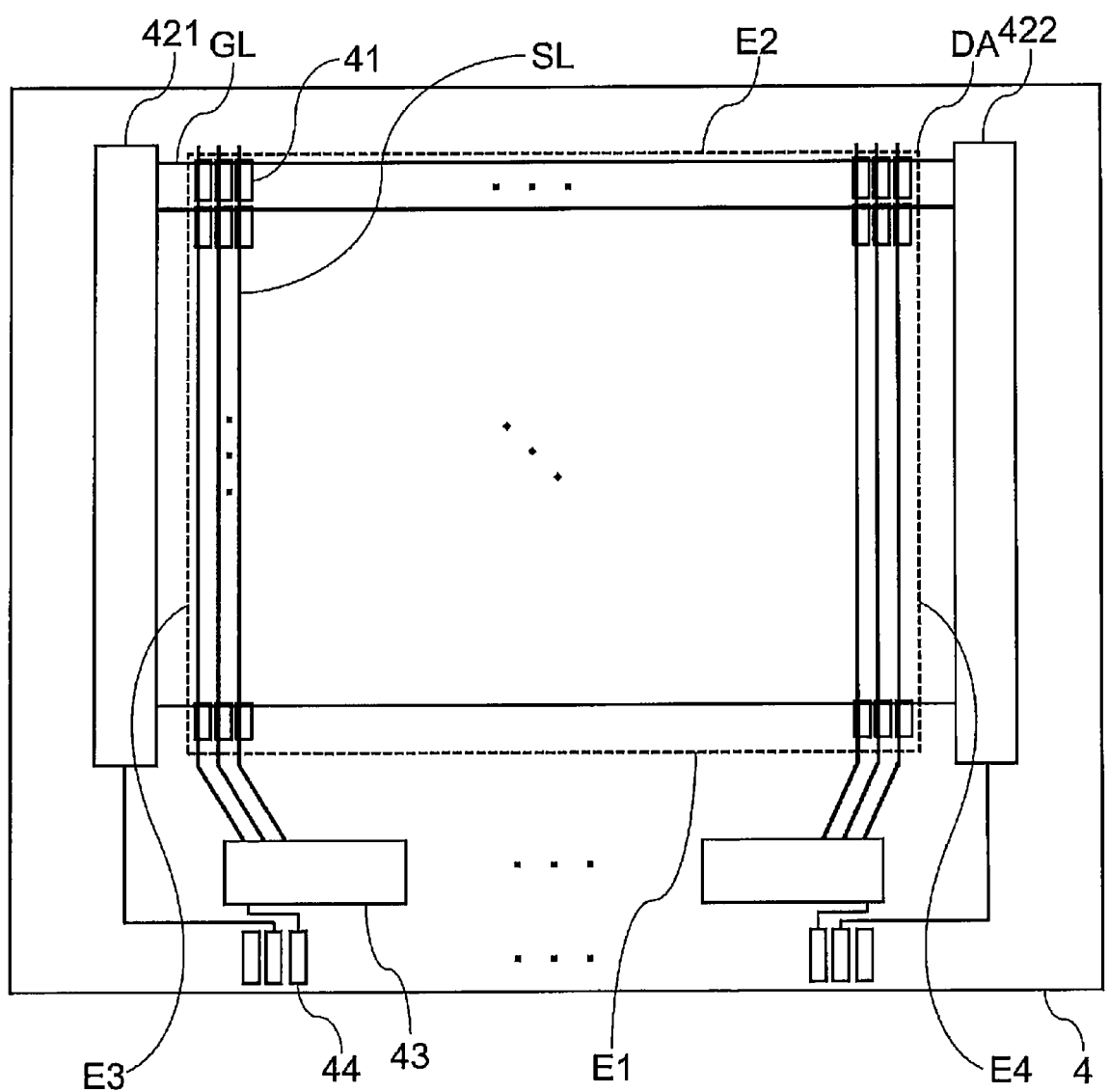
FIG. 2 is a plan view illustrating a configuration of a first substrate.
Figure 3:
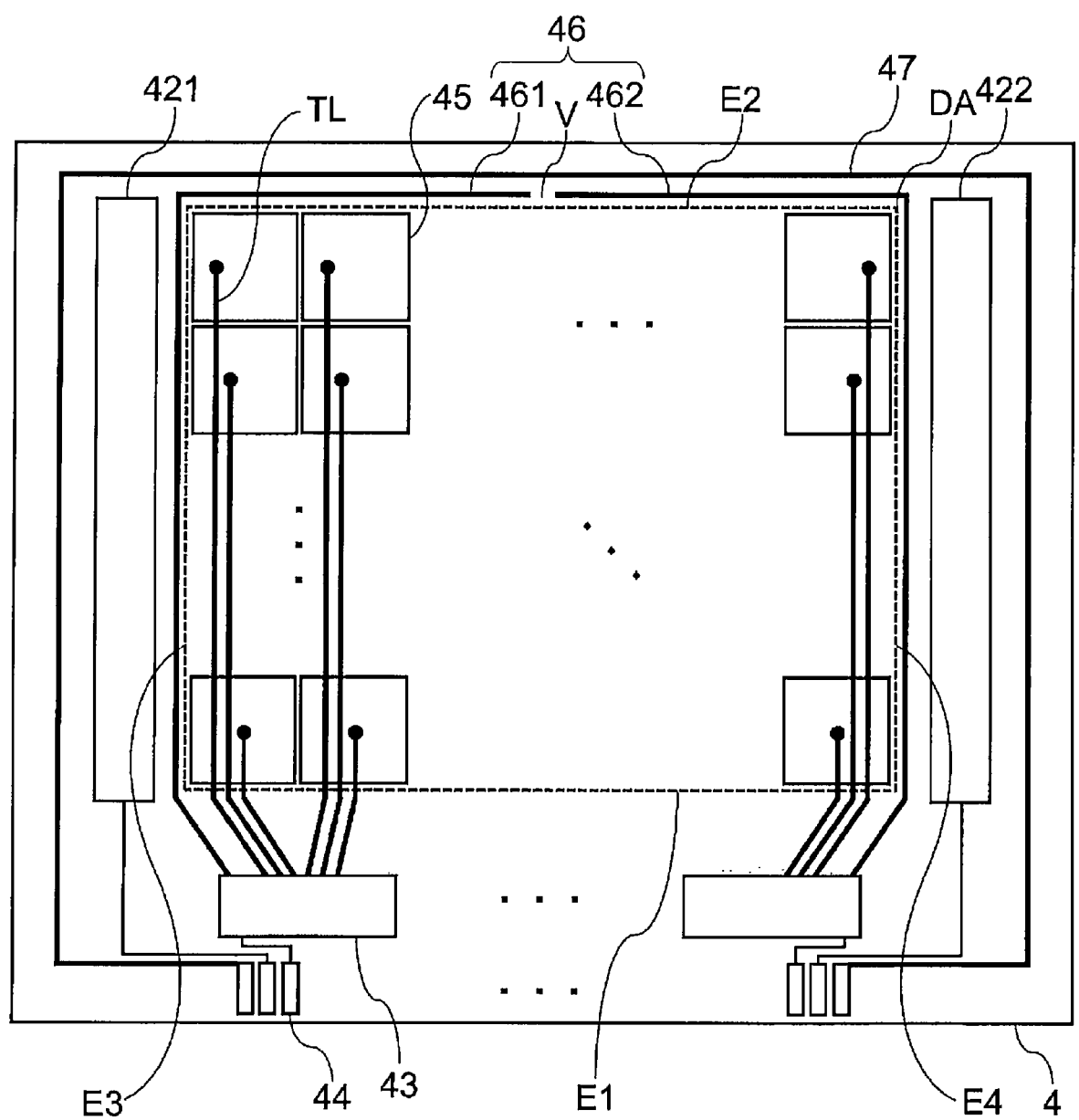
FIG. 3 is a plan view illustrating the configuration of the first substrate.

Next, a configuration of the first substrate 4 will be described with reference to FIGS. 2 and 3. FIGS. 2 and 3 are plan views illustrating the configuration of the first substrate 4. Note that, for convenience of illustration, various electrodes, wires, and the like which are formed on the first substrate 4 are illustrated in separate drawings of FIGS. 2 and 3.

As illustrated in FIG. 2, the first substrate 4 includes pixel electrodes 41, gate drivers 421 and 422, a common driver 43, a terminal 44, gate lines GL, and source lines SL. As illustrated in FIG. 3, the first substrate 4 further includes touch sensor electrodes 45, a first wire 46, a second wire 47, and touch lines TL.

An insulating layer (not illustrated) is formed between the pixel electrodes 41 and the touch sensor electrodes 45 to separate the pixel electrodes 41 and the touch sensor electrodes 45. The display device 1 displays an image above a display area DA which is rectangular and in which the pixel electrodes 41 are arrayed. The touch sensor electrodes 45 are formed within the display area DA. Each of the gate drivers 421 and 422, the common driver 43, the terminal 44, the first wire 46, and the second wire 47 is disposed outside the display area DA.

A drain electrode of a thin film transistor (TFT) (not illustrated) is connected to each pixel electrode 41, and a gate line GL and a source line SL are connected to a gate and a source of the TFT, respectively. The two gate drivers 421 and 422 operate synchronously and apply, to the gate lines GL, a voltage signal for switching on the TFT one by one sequentially. Then, at a timing at which the TFT is switched on, a voltage signal of the source line SL is applied to the pixel electrode 41.

For example, the gate drivers 421 and 422 are provided by gate on array (GOA) in which a transistor, which constitutes a driver, or the like is formed directly on a glass substrate. For example, the common driver 43 is provided by chip on glass (COG) in which an integrated circuit (IC) which constitutes a driver is mounted on a glass substrate. Further, a flexible printed circuit (FPC) is connected to the terminal 44.

The display device 1 drives the liquid crystal molecules by applying an electric field to the liquid crystal molecules in a direction (hereinafter, referred to as "transverse direction") which is parallel to the surface of the first substrate 4. For example, the display device 1 drives the liquid crystal molecules by using a driving system such as in-plane switching (IPS) or fringe-field switching (FFS). In this case, the touch sensor electrode 45 also functions as a common electrode (counter electrode) that generates an electric field between the touch sensor electrode 45 and the pixel electrode 41.

Each touch sensor electrode 45 has a rectangular shape, each side of which is about several mm (for example, 2 to 5 mm), and is larger than the pixel electrode 41. In the touch sensor electrode 45, a slit (not illustrated) of about several μm is formed for generating an electric field in the transverse direction between the touch sensor electrode 45 and the pixel electrode 41. Note that the common driver 43 drives the touch sensor electrode 45 via the touch line TL and detects a touch position. For example, the common driver 43 is of a self-capacitance type that detects a touch position based on the magnitude of a capacitance coupled to each electrode, drives the touch sensor electrode 45, and detects a touch position.

For example, in a case where the touch sensor electrode 45 functions as a common electrode (counter electrode), the common driver 43 applies a fixed voltage common signal to the touch sensor electrode 45. For example, in a case of detecting a touch position by using the touch sensor electrode 45, the common driver 43 applies an AC voltage drive signal to the touch sensor electrode 45.

The display area DA has a first side E1 that is a side closest to the common driver 43, a second side E2 that is a side facing the first side, and a third side E3 and a fourth side E4 which are perpendicular to both the first side E1 and the second side E2. The gate driver 421 is formed at a position apart from the display area DA in a direction perpendicular to the third side E3. The gate driver 422 is formed at a position apart from the display area DA in a direction perpendicular to the fourth side E4.

The first wire 46 is formed along the second side E2, the third side E3, and the fourth side E4 of the display area DA, and a drive signal is input to the first wire 46 from the common driver 43. Since the first wire 46 is capacitively coupled to the touch sensor electrode 45 that is near the periphery within the display area DA, when a drive signal is input to the first wire 46, it is possible to enhance a drive signal applied to the touch sensor electrode 45. Thereby, rounding of the drive signal in the touch sensor electrode 45 is suppressed, and it is therefore possible to enhance accuracy in detecting a touch position which is near the periphery within the display area DA. Note that, in the display area DA, rounding of the drive signal is low near the first side E1 which is close to the common driver 43, and thus the accuracy in detecting a touch position is relatively high, even when the first wire 46 is not formed near the first side E1.

The first wire 46 is divided into a first part 461 and a second part 462. The first part 461 is formed along the third side E3 and the second side E2 of the display area DA. The second part 462 is formed along the fourth side E4 and the second side E2 of the display area DA. Furthermore, portions of the first part 461 and the second part 462 that extend along the second side E2 are separated in a direction parallel to the second side E2 to thereby form a gap V therebetween.

The second wire 47 is formed along the third side E3, the second side E2, and the fourth side E4 of the display area DA. Both ends of the second wire 47 are connected to terminals 44, and an electric potential serving as a reference for the drive signal is applied to the second wire 47 from the terminals 44. Note that the electric potential serving as the reference for the drive signal may be applied to the second wire 47 from the common driver 43, or a common signal or a ground potential may be applied to the second wire 47 from the terminals 44 or the common driver 43.

The second wire 47 is formed at a position further apart from the display area DA than the first wire 46, and the first wire 46 is positioned between the second wire 47 and the display area DA. Furthermore, with respect to the gate drivers 421 and 422, when a direction in which the display area DA exists is defined as the front and a direction opposite thereto is defined as the rear, the second wire 47 is formed so as to pass through the rear of each of the gate drivers 421 and 422.

As described above, in the display device 1, the first wire 46 is formed outside the display area DA, and the second wire 47 is formed further outside the first wire 46. Thus, in the display device 1, the first wire 46 is able to enhance accuracy in detecting a touch position near the periphery within the display area DA, and the second wire 47 is able to suppress breakdown of an electrode caused by ESD in the display area DA.

Further, in the display device 1, the gap V formed in the first wire 46 is shielded by the second wire 47. Thus, it is possible to suppress breakdown of an electrode in the display area DA, which is caused by ESD via the gap V.

Note that, although FIGS. 2 and 3 illustrate the configuration in which the two gate drivers 421 and 422 are provided, the configuration may be such that only one gate driver is provided.

Moreover, the first wire 46 is not necessarily divided into the first part 461 and the second part 462. For example, the first wire 46 may be formed continuously along the third side E3, the second side E2, and the fourth side E4 of the display area DA. However, when the first wire 46 is divided into the first part 461 and the second part 462 as illustrated in FIG. 3, since a loop current does not flow in the first wire 46, it is possible to suppress a degradation in accuracy in detecting a touch position due to electromagnetic interference (EMI).

Second Embodiment

Next, a second embodiment will be described. The second embodiment differs from the first embodiment in the configuration of the second wire, and the other configurations are common to those in the first embodiment. Thus, a portion different from that of the first embodiment will be described below.

Figure 4:
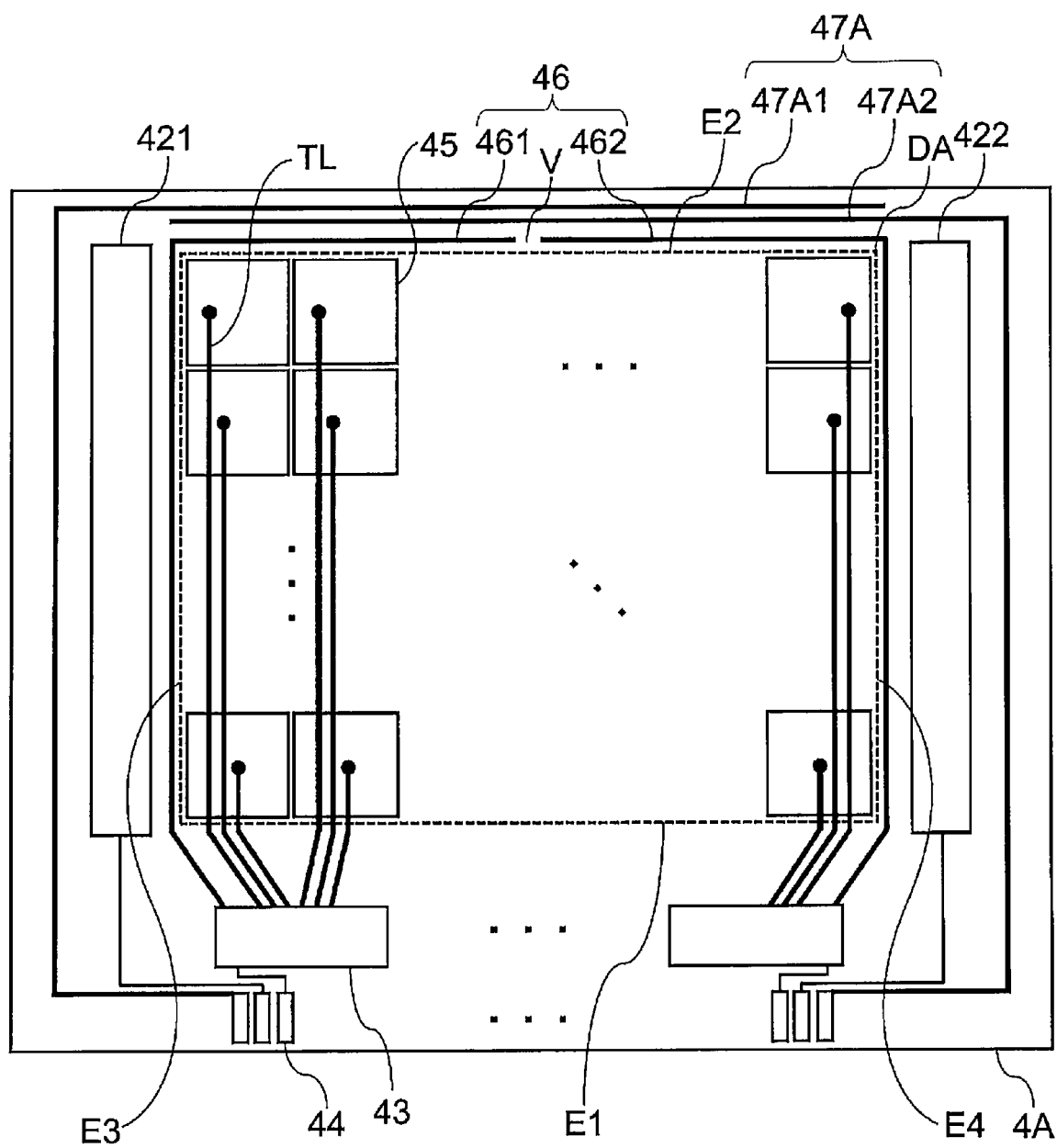
FIG. 4 is a plan view illustrating a configuration of a first substrate included in a display device according to a second embodiment.

FIG. 4 is a plan view illustrating a configuration of a first substrate 4A included in a display device according to the second embodiment. As illustrated in FIG. 4, a second wire 47A is divided into a third part 47A1 and a fourth part 47A2. The third part 47A1 is formed along the third side E3 and the second side E2 of the display area DA. The fourth part 47A2 is formed along the fourth side E4 and the second side E2 of the display area DA.

Moreover, a portion of the third part 47A1, which extends along the second side E2, and a portion of the fourth part 47A2, which extends along the second side E2, are provided side by side in a direction perpendicular to the second side E2. In other words, a portion of the third part 47A1, which extends from the third side E3 toward the fourth side E4, and a portion of the fourth part 47A2, which extends from the fourth side E4 toward the third side E3, pass each other near the second side E2.

In the configuration of the present embodiment, the second wire 47A is divided into the third part 47A1 and the fourth part 47A2. Accordingly, even when noise is mixed in the second wire 47A, a loop current does not flow therein, and it is therefore possible to suppress a degradation in accuracy in detecting a touch position due to EMI.

Moreover, the portions of the third part 47A1 and the fourth part 47A2, which extend along the second side E2, are provided side by side in the direction perpendicular to the second side E2. Thus, since two wires are formed for electrostatic protection near the second side E2 of the display area DA, it is possible to effectively suppress breakdown of an electrode caused by ESD in the display area DA. Particularly, although the gap V of the first wire 46 is formed near the second side E2 of the display area DA, since the two wires for electrostatic protection are formed, it is possible to effectively suppress breakdown of an electrode in the display area DA, which is caused by ESD via the gap V.

Note that, when the portions of the third part 47A1 and the fourth part 47A2, which pass each other, are longer, it is possible to increase the effect of suppressing breakdown caused by ESD. Thus, for example, the entire second side E2 of the display area DA, which extends from one end to the other end, may be shielded by the portions of the third part 47A1 and the fourth part 47A2, which pass each other.

Third Embodiment

Next, a third embodiment will be described. The third embodiment differs from the first and second embodiments in the configuration of the second wire, and the other configurations are common to those of the first and second embodiments. Thus, a portion different from the portions of the first and second embodiments will be described below.

Figure 5:
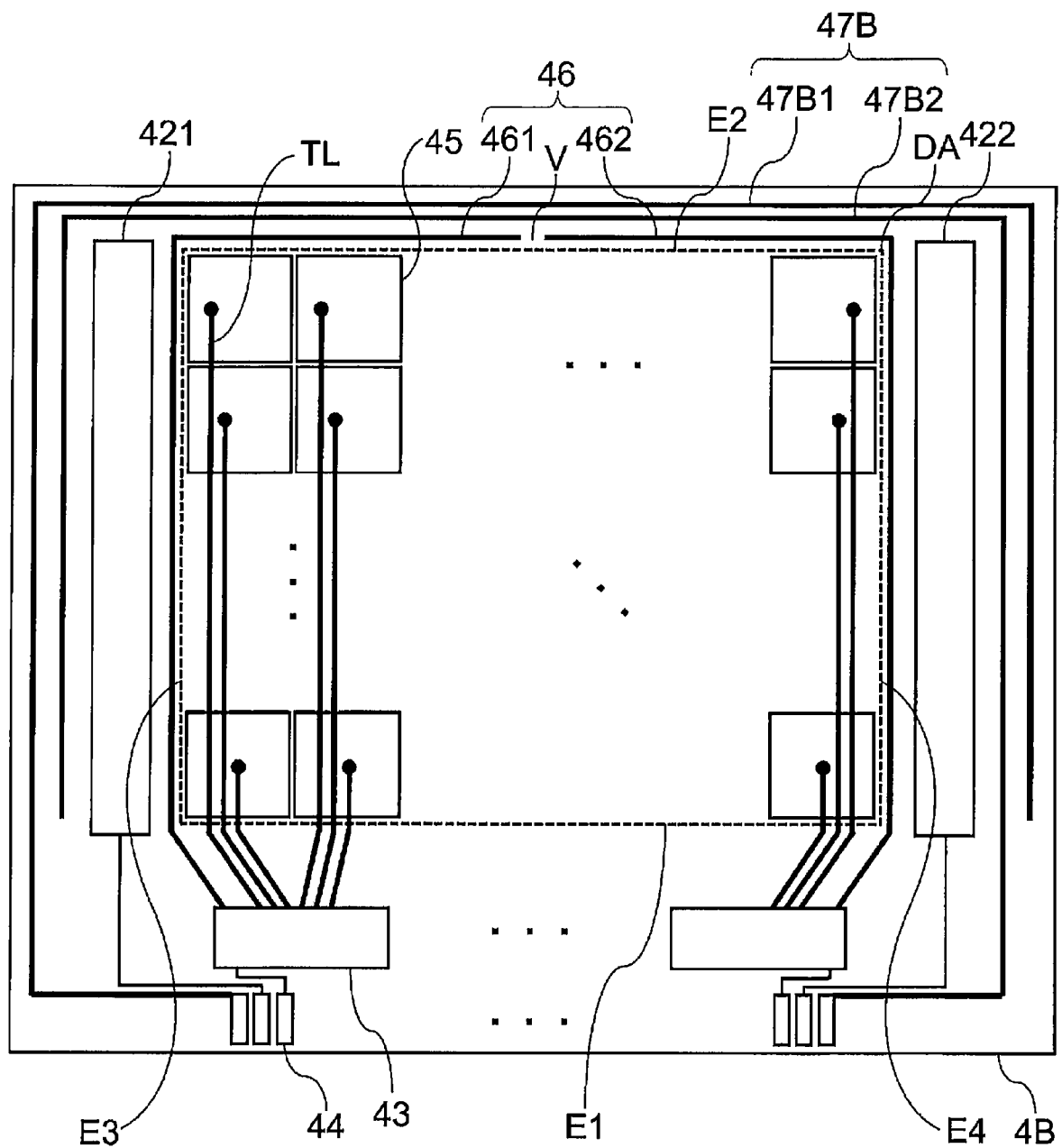
FIG. 5 is a plan view illustrating a configuration of a first substrate included in a display device according to a third embodiment.

FIG. 5 is a plan view illustrating a configuration of a first substrate 4B included in a display device according to the third embodiment. As illustrated in FIG. 5, the second wire 47B is divided into a third part 47B1 and a fourth part 47B2. The third part 47B1 is formed along the third side E3, the second side E2, and the fourth side E4 of the display area DA. The fourth part 47B2 is formed along the fourth side E4, the second side E2, and the third side E3 of the display area DA.

Here, with respect to the gate drivers 421 and 422, a direction in which the display area DA exists is defined as the front, and a direction opposite thereto is defined as the rear. A portion of the third part 47B1 is formed at the rear of the gate driver 422. On the other hand, a portion of the fourth part 47B2 is formed at the rear of the gate driver 421. Further, the third part 47B1 and the fourth part 47B2 pass each other not only near the second side E2 of the display area DA but also at the rear of the gate driver 421 and the rear of the gate driver 422.

In the configuration of the present embodiment, the portions of the third part 47B1 and the fourth part 47B2 pass each other at the rear of the gate driver 421 and the rear of the gate driver 422. Accordingly, since two wires for electrostatic protection are formed at the rear of the gate driver 421 and the rear of the gate driver 422, it is possible to suppress breakdown of each of the gate drivers 421 and 422 caused by ESD.

Note that only one gate driver may be provided. In this case, it is desirable that portions of the third part 47B1 and the fourth part 47B2 pass each other at the rear of the gate driver. With this, it is possible to suppress breakdown of the gate driver caused by ESD.

Fourth Embodiment

Next, a fourth embodiment will be described. The fourth embodiment is a modified example of the second and third embodiments.

Figure 6:
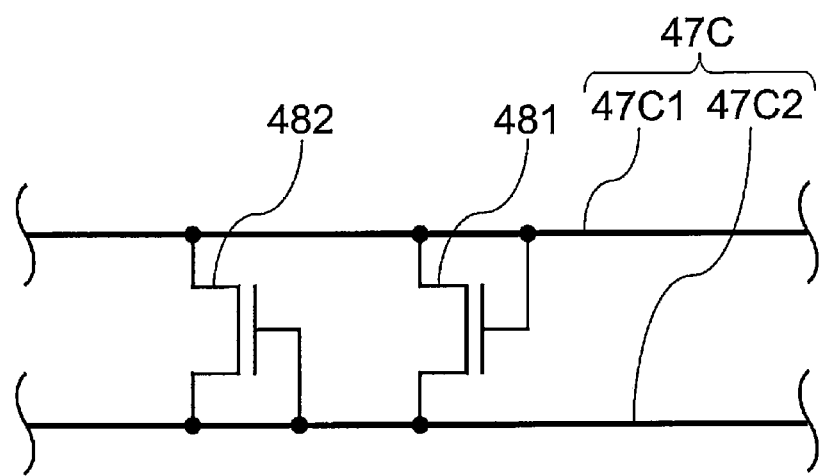
FIG. 6 is a circuit diagram illustrating a configuration of a second wire included in a display device according to a fourth embodiment.

FIG. 6 is a circuit diagram illustrating a configuration of a second wire included in a display device according to the fourth embodiment. As illustrated in FIG. 6, the second wire 47C is divided into a third part 47C1 and a fourth part 47C2. Furthermore, the display device according to the fourth embodiment includes transistors 481 and 482 that are both connected to the third part 47C1 and the fourth part 47C2.

For example, the transistors 481 and 482 are N-channel field effect transistors. The transistor 481 has a gate and a source connected to the third part 47C1 and has a drain connected to the fourth part 47C2. In this case, the transistor 481 functions as a diode whose forward direction is a direction from the third part 47C1 to the fourth part 47C2.

On the other hand, the transistor 482 has a gate and a source connected to the fourth part 47C2 and has a drain connected to the third part 47C1. In this case, the transistor 482 functions as a diode whose forward direction is a direction from the fourth part 47C2 to the third part 47C1.

In the configuration of the present embodiment, bi-directional diodes are formed in a gap between the third part 47C1 and the fourth part 47C2. When ESD is generated, the bi-directional diodes cause an electric current to flow between the third part 47C1 and the fourth part 47C2. Thus, it is possible to suppress breakdown of an electrode in the display area DA, which is caused by ESD via the gap, and also possible to suppress breakdown of the third part 47C1 or the fourth part 47C2 caused by ESD.

Note that the transistors 481 and 482 may be substituted with diodes. However, the transistors 481 and 482 are able to be assembled at the same time as the TFTs and the gate drivers 421 and 422 assembled in the display area DA. Moreover, since resistance of the transistors 481 and 482 is high, it is possible to suppress flow of an electric current between the third part 47C1 and the fourth part 47C2. That is, it is possible to suppress a degradation in accuracy in detecting a touch position due to EMI when a loop current flows in the second wire 47C.

The transistors 481 and 482 may be P-channel transistors. In this case, each forward direction when the P-channel transistors 481 and 482 function as diodes is opposite to the forward direction when the N-channel transistors 481 and 482 function as diodes.

Modifications and so on

The embodiments described above are merely exemplifications for implementing the disclosure. Thus, the disclosure is not limited to the above-described embodiments and is able to be implemented by appropriately modifying the above-described embodiments within a range not departing from the gist of the disclosure.

For example, in the first to fourth embodiments described above, description has been given on the assumption that the common driver 43 has functions of both a source driver for image display and a touch panel controller for touch position detection. However, a source driver and a touch panel controller may each be provided individually instead of the common driver 43.

For example, in the first to fourth embodiments described above, description has been given on the assumption that the display area DA is rectangular. However, the display area DA is not limited to being rectangular and may be, for example, trapezoidal or may have a shape having a round corner. Regardless of the shape of the display area DA, the first wire 46 and the second wires 47, 47A, 47B, or 47C are disposed along the second side E2 to the fourth side E4 of the display area DA.

In addition, for example, in the first to fourth embodiments described above, description has been given for the case where the first part 461 and the second part 462 that constitute the first wire 46 are separated in the direction parallel to the second side E2 of the display area DA to thereby form the gap V. However, in the first wire, the first part 461 and the second part 462 may be separated in a direction parallel to the third side E3 of the display area DA to thereby form a gap or separated in a direction parallel to the fourth side E4 to thereby form a gap.

Further, for example, in the first to fourth embodiments described above, description has been given for the case where the pixel electrodes 41, the touch sensor electrodes 45, the first wire 46, and the second wires 47, 47A, 47B, or 47C are formed on the first substrate 4. However, they may be formed on the second substrate 6 facing the first substrate 4 with the liquid crystal layer 5 therebetween.

The display device described above may be described as follows.

A display device includes: a plurality of pixel electrodes; a first driver disposed outside a display area in which the plurality of pixel electrodes are arrayed; a touch sensor electrode which is disposed within the display area and to which a drive signal is applied from the first driver; a first wire which is disposed outside the display area and to which the drive signal is applied from the first driver; and a second wire disposed outside the display area, in which a predetermined electric potential is applied to the second wire, the first wire is disposed between the second wire and the display area, the display area includes a first side closest to the first driver, a second side facing the first side, and a third side and a fourth side each of which extends between the first side and the second side, each of the first wire and the second wire is disposed along the second side, the third side, and the fourth side, the first wire is divided into a first part and a second part, the first part and the second part are separated in a direction parallel to any of the second side, the third side, and the fourth side to form a gap between the first part and the second part, and the second wire is disposed on a straight line passing through the gap and the display area (first configuration). According to the configuration, the first wire is able to enhance accuracy in detecting a touch position near a periphery within the display area, and the second wire is able to suppress breakdown of an electrode caused by ESD in the display area. Furthermore, according to the configuration, the first wire and the second wire are formed along the second side, the third side, and the fourth side of the display area, at which rounding of the drive signal is relatively high. Accordingly, it is possible to effectively enhance accuracy in detecting a touch position and also possible to suppress breakdown caused by ESD. Moreover, according to the configuration, since a loop current does not flow in the first wire, it is possible to suppress a degradation in accuracy in detecting a touch position, which is caused by EMI.

In the first configuration, the first part may be disposed along the third side and the second side, the second part may be disposed along the fourth side and the second side, and portions of the first part and the second part, which extend along the second side, may be separated in the direction parallel to the second side to form the gap between the first part and the second part, and the second wire may be disposed on a straight line perpendicular to the second side and passing through the gap (second configuration). According to the configuration, since the gap of the first wire is shielded by the second wire, it is possible to suppress breakdown of an electrode in the display area, which is caused by ESD via the gap.

In the first or second configuration, the second wire may be divided into a third part disposed along the third side and the second side and a fourth part disposed along the fourth side and the second side (third configuration). According to the configuration, even when noise is mixed in the second wire, a loop current does not flow therein, and it is therefore possible to suppress a degradation in accuracy in detecting a touch position, which is caused by EMI.

In the third configuration, a portion of the third part, which extends along the second side, and a portion of the fourth part, which extends along the second side, may be provided side by side in a direction perpendicular to the second side (fourth configuration). According to the configuration, since two wires for electrostatic protection are formed near the second side of the display area, it is possible to sufficiently suppress breakdown of an electrode in the display area, which is caused by ESD.

In the fourth configuration, the display device may further include a second driver disposed at least at a position apart from the display area in a direction perpendicular to the third side or at a position apart from the display area in a direction perpendicular to the fourth side, and the second driver may be disposed between the first wire and the second wire (fifth configuration). According to the configuration, since the second driver is shielded by the two wires for electrostatic protection, it is possible to suppress breakdown of the second driver, which is caused by ESD.

In any one of the third to fifth configurations, the display device may further include a first diode and a second diode that connect the third part and the fourth part, a forward direction of the first diode may be a direction from the third part toward the fourth part, and a forward direction of the second diode may be a direction from the fourth part toward the third part (sixth configuration). According to the configuration, bi-directional diodes are formed in a gap between the third part and the fourth part. Thus, it is possible to suppress breakdown of an electrode in the display area DA, which is caused by ESD via the gap, and also breakdown of the third part or the fourth part, which is caused by ESD.

In the sixth configuration, the first diode and the second diode may be constituted by a first transistor having a gate electrode and a first electrode connected to the third part and having a second electrode connected to the fourth part and a second transistor having a gate electrode and a first electrode connected to the fourth part and having a second electrode connected to the third part (seventh configuration). According to the configuration, the transistors are able to be assembled at the same time as the display area assembled. Moreover, since resistance of the transistors is high, it is possible to suppress flow of an electric current between the third part and the fourth part. That is, it is possible to suppress a degradation in accuracy in detecting a touch position, which is caused by EMI when a loop current flows in the second wire.

In any one of the first to seventh configurations, the display device may further include: a first substrate; and a second substrate facing the first substrate, and the plurality of pixel electrodes, the touch sensor electrode, the first wire, and the second wire may be formed on the first substrate or the second substrate (eighth configuration). In any one of the first to eighth configurations, the predetermined electric potential may be an electric potential serving as a reference for the drive signal (ninth configuration).

The present disclosure contains subject matter related to that disclosed in Japanese Priority Patent Application JP 2020-067252 filed in the Japan Patent Office on Apr. 3, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a plurality of pixel electrodes;
a first driver disposed outside a display area in which the plurality of pixel electrodes are arrayed;
a touch sensor electrode which is disposed within the display area and to which a drive signal is applied from the first driver;
a first wire which is disposed outside the display area and to which the drive signal is applied from the first driver; and
a second wire disposed outside the display area, wherein
a predetermined electric potential is applied to the second wire, and the first wire is disposed between the second wire and the display area,
the display area includes a first side closest to the first driver, a second side facing the first side, and a third side and a fourth side each of which extends between the first side and the second side,
each of the first wire and the second wire is disposed along the second side, the third side, and the fourth side,
the first wire is divided into a first part and a second part,
the first part and the second part are separated in a direction parallel to any of the second side, the third side, and the fourth side, to form a gap between the first part and the second part, and
the second wire is disposed on a straight line passing through the gap and the display area.

2. The display device according to claim 1, wherein
the first part is disposed along the third side and the second side, the second part is disposed along the fourth side and the second side, and portions of the first part and the second part, which extend along the second side, are separated in the direction parallel to the second side, to form the gap, and
the second wire is disposed on a straight line perpendicular to the second side and passing through the gap.

3. The display device according to claim 1, wherein the second wire is divided into a third part disposed along the third side and the second side, and a fourth part disposed along the fourth side and the second side.

4. The display device according to claim 3, wherein a portion of the third part, which extends along the second side, and a portion of the fourth part, which extends along the second side, are disposed side by side in a direction perpendicular to the second side.

5. The display device according to claim 4, further comprising
a second driver disposed at least at a position apart from the display area in a direction perpendicular to the third side or at a position apart from the display area in a direction perpendicular to the fourth side, wherein
the second driver is disposed between the first wire and the second wire.

6. The display device according to claim 3, further comprising
a first diode and a second diode that connect the third part and the fourth part, wherein
a forward direction of the first diode is a direction from the third part toward the fourth part, and a forward direction of the second diode is a direction from the fourth part toward the third part.

7. The display device according to claim 6, wherein
the first diode and the second diode include
a first transistor having a gate electrode and a first electrode connected to the third part and having a second electrode connected to the fourth part and
a second transistor having a gate electrode and a first electrode connected to the fourth part and having a second electrode connected to the third part.

8. The display device according to claim 1, further comprising:
a first substrate; and a second substrate facing the first substrate, wherein
the plurality of pixel electrodes, the touch sensor electrode, the first wire, and the second wire are formed on the first substrate or the second substrate.

9. The display device according to claim 1, wherein the predetermined electric potential is an electric potential serving as a reference for the drive signal.

* * * * *